United States Patent
Lee et al.

(10) Patent No.: US 8,576,746 B2
(45) Date of Patent: Nov. 5, 2013

(54) SENSOR NODE IDENTIFICATION METHOD FOR HIERARCHICAL SENSOR NETWORK, AND COMPONENT THEREFOR

(75) Inventors: Jun Seob Lee, Daejeon (KR); Yong-Woon Kim, Cheonan-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 425 days.

(21) Appl. No.: 12/477,553

(22) Filed: Jun. 3, 2009

(65) Prior Publication Data

US 2009/0303905 A1 Dec. 10, 2009

(30) Foreign Application Priority Data

Jun. 4, 2008 (KR) .................... 10-2008-0052494
Mar. 30, 2009 (KR) .................... 10-2009-0027093

(51) Int. Cl.
*H04L 12/28* (2006.01)

(52) U.S. Cl.
USPC .......... 370/254; 370/256; 370/351; 370/408; 709/221; 709/237

(58) Field of Classification Search
USPC .......... 370/254–257, 338; 455/574; 701/200; 707/10; 709/221, 237
See application file for complete search history.

(56) References Cited

U.S. PATENT DOCUMENTS

| | | | | |
|---|---|---|---|---|
| 5,926,101 A | * | 7/1999 | Dasgupta | 370/408 |
| 7,020,501 B1 | * | 3/2006 | Elliott et al. | 455/574 |
| 2004/0103139 A1 | * | 5/2004 | Hubbard et al. | 709/201 |
| 2004/0249563 A1 | * | 12/2004 | Otsuki et al. | 701/200 |
| 2006/0190458 A1 | * | 8/2006 | Mishina et al. | 707/10 |
| 2007/0210916 A1 | * | 9/2007 | Ogushi et al. | 340/531 |
| 2009/0019056 A1 | * | 1/2009 | Othman et al. | 707/10 |
| 2009/0122797 A1 | * | 5/2009 | Thubert et al. | 370/392 |

FOREIGN PATENT DOCUMENTS

KR 10-2007-0057597 6/2007

OTHER PUBLICATIONS

"Identification Scheme for Sensor Network," Telecommunications Technology Association (TTA) Standard, Jun. 3, 2008.

* cited by examiner

*Primary Examiner* — Andrew Chriss
*Assistant Examiner* — Mohamed Kamara
(74) *Attorney, Agent, or Firm* — Staas & Halsey LLP

(57) ABSTRACT

A sensor node identification method by a first component of a first layer in a hierarchical sensor network includes: receiving a sensing request including sensor node identification information from a second component of a second layer prior to the first layer; modifying the sensor node identification information by removing an identifier of the first layer from the sensor node identification information when an identifier of the first layer matches an identifier of the first component among the sensor node identification information; and transmitting a sensing request including the modified sensor node identification information to a third component of a third layer subsequent to the first layer.

7 Claims, 5 Drawing Sheets

SENSOR NODE IDENTIFICATION METHOD FOR HIERARCHICAL SENSOR NETWORK, AND COMPONENT THEREFOR

CROSS-REFERENCE TO RELATED APPLICATION

This application claims priority to and the benefit of Korean Patent Application No. 10-2008-0052494 and 10-2009-0027093 filed in the Korean Intellectual Property Office on Jun. 4, 2008 and Mar. 30, 2009, the entire contents of which are incorporated herein by reference.

BACKGROUND OF THE INVENTION (a) Field of the Invention

The exemplary embodiment of the present invention relates to a sensor node identification method by a component configuring a hierarchical sensor network, and a component therefor.

(b) Description of the Related Art

Research and development on a sensor network, which is a based network for implementing a ubiquitous environment, have been variously progressed at home and abroad. As a result, the sensor network is expected to be applied to various fields, such as logistics, environment control, home networks, traffic, etc.

Data collected through the sensor in the sensor network environment can be used for various ubiquitous sensor network (USN) service fields by systematically analyzing them and interlinking services.

However, the development has been made using different protocols and different communication technologies for each service, such that it is difficult to share information therebetween.

Further, media access control (MAC), Internet protocol (IP), and optional allocation addresses, which are used in an existing sensor network, are only addresses for communication and do not serve as an identifier for managing each node and network service.

Therefore, in order to extend the sensor network to a wide USN, a need exists for a configuration node between different USN services, a network, and a standardized identification system that is capable of identifying services and searching and managing collected information.

The identification system mentioned herein is a unique identifier provided to be able to identify various physical objects, networks, service types, etc., in the USN, and includes information necessary for object management, position determination, and access, a service management scheme for interlinking, etc.

The sensor node identifier of the related art has been designed to be uniquely identified around the world or defined and used to be uniquely identified only in a specific sensor network.

However, when the sensor node identifier is designed as a unique identifier around the world, the length of the identifier is long, which imposes a burden on the sensor network configured of mainly low-performance devices, and when the sensor node identifier is defined to be uniquely identified only in the specific sensor network, compatibility between different sensor networks is deteriorated.

The above information disclosed in this Background section is only for enhancement of understanding of the background of the invention and therefore it may contain information that does not form the prior art that is already known in this country to a person of ordinary skill in the art.

SUMMARY OF THE INVENTION

An exemplary embodiment of the present invention proposes to solve the above-mentioned problems. The present invention has been made in effort to provide a sensor node identification method for uniquely identifying targeted sensor nodes in each layer by hierarchically identifying components in a sensor network and combining component identifiers for each layer, and a component therefor.

In order to achieve the above object, an exemplary embodiment of the present invention provides a sensor node identification method by a first component of a first layer in a hierarchical sensor network, including: receiving a sensing request including sensor node identification information from a second component of a second layer prior to the first layer; modifying the sensor node identification information by removing an identifier of the first layer from the sensor node identification information when an identifier of the first layer matches an identifier of the first component among the sensor node identification information; and transmitting a sensing request including the modified sensor node identification information to a third component of a third layer subsequent to the first layer.

At this time, the first component includes at least one of a client, a service provider, and a gateway.

Herein, when the first component is the service provider, the second component is the client, and the third component is the gateway, the sensor node identification information includes information formed by a combination of the service provider identifier, the gateway identifier, and the sensor node identifier.

Further, when the first component is the gateway, the second component is the service provider, and the third component is the sensor node, the sensor node identification information includes information formed by a combination of the gateway identifier and the sensor node identifier.

Another embodiment of the present invention provides a component of a hierarchical sensor network for identifying a first sensor node of a first layer in a hierarchical sensor network, including: a receiving unit that receives a sensing request including sensor node identification information from a second component of a second layer prior to the first layer; an identification information analyzing unit that modifies the sensor node identification information by removing an identifier of the first layer from the sensor node identification information when an identifier of the first layer matches an identifier of the first component among the sensor node identification information; and a transmitting unit that transmits a sensing request including the modified sensor node identification information to a third component of a third layer subsequent to the first layer.

The first component includes at least one of a client and a gateway, and when the first component is the gateway, the second component is the client, and the third component is the sensor node, the sensor node identification information is formed by a combination of the gateway identifier and the sensor node identifier. With the embodiments of the present invention, the identification information for uniquely identifying the targeted sensor node can be variably configured according to each layer of the sensing service network, such that the sensor network is not actually burdened with an amount of data while providing the identification system commonly used around the world.

DETAILED DESCRIPTION OF THE EMBODIMENTS

Figure 1A:
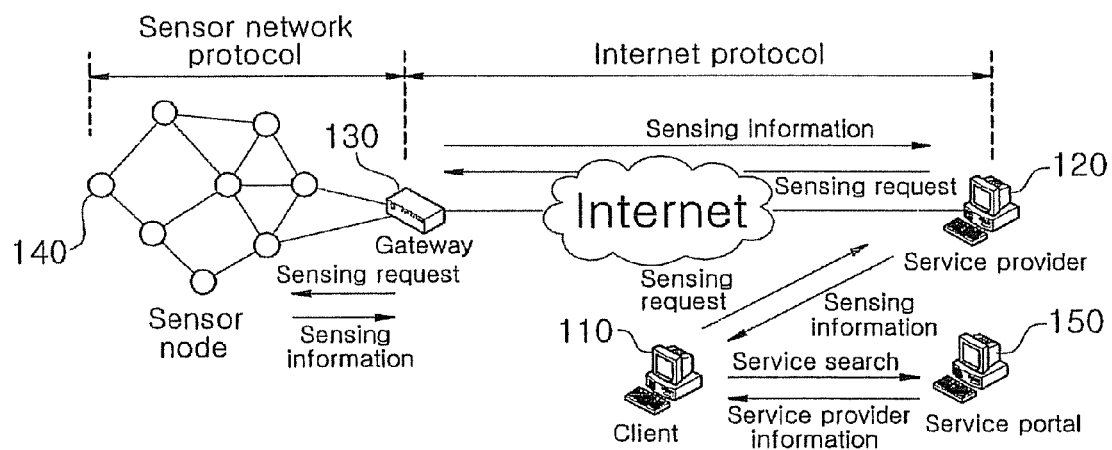
FIGS. 1A and 1B show a structure of a sensing service network to which an embodiment of the present invention is applied.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the whole specification unless explicitly described to the contrary, the word "comprise" and variations such as "comprises" or "comprising" will be understood to imply the inclusion of stated elements but not the exclusion of any other elements.

In addition, the terms "-er", "-or", and "module" described in the specification mean units for processing at least one function and operation, and can be implemented by hardware components or software components and combinations thereof.

Throughout the specification, a sensing service network indicates a network including a sensing requester, a sensing service provider, and a sensing information provider in a broad sense, and a sensor network indicates a network including the sensing information provider(s) in a narrow sense.

Figure 1B:
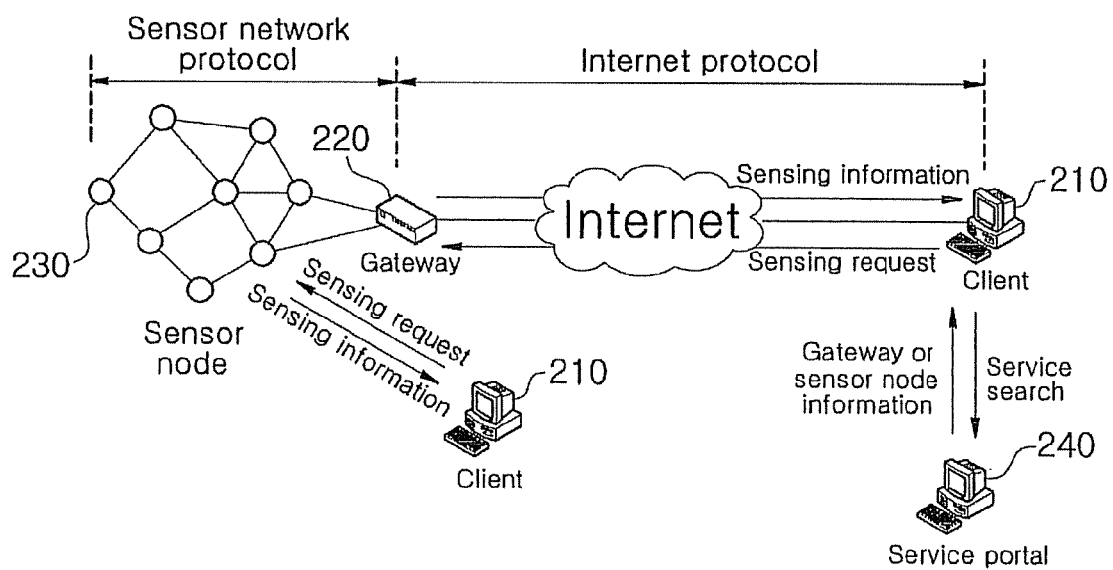

FIGS. 1A and 1B show a structure of a sensing service network to which an embodiment of the present invention is applied.

In FIG. 1A, a sensing service network includes components that includes a client 110, a service provider 120, a gateway 130, and a sensor node 140, and may further optionally include a service portal 150.

The client 110 is referred to as an issuing agent, and transmits a sensing request to the service provider 120.

The client 110 can search a database included therein to find a service provider 120 that provides the client's desired sensing service, and can search it using external resources such as a service portal, etc.

The service portal 150 includes a user interface and/or an authentication process that can be easily accessed by the client 110, and when it receives the search request from the client 110, it searches the service provider 120 providing the corresponding sensing service and provides it to the client 110.

When the service provider 120 receives the sensing request from the client 110, it searches the sensor node 140 providing the sensing information corresponding to the sensing request and transmits the sensing request including the searched sensor node identification information to the gateway 130.

Thereafter, when the service provider 120 receives the sensing information on the sensing request through the gateway 130, it provides the sensing information to the corresponding client 110.

The service provider 120 performs a predetermined analyzing and/or editing process, such that it can commercialize the sensing information into a type that is easily accessible by the user and provide it.

When the gateway 130 receives the sensing request from the service provider 120, it transmits the received sensing request to the sensor node 140 of the sensor network.

And, when the gateway 130 receives the sensing information on the sensing request from at least one of sensor node(s) 140, it collects the sensing information.

Further, the gateway 130 performs a relay role for linking the sensor network with the external network. For example, when the external network connected with the service provider 120 is an IP-based internet, the gateway 130 mutually converts protocols between the sensor network and the Internet.

The conversion of protocols includes the conversion between the internet protocol and the sensor network protocol as well as the conversion of MAC/PHY protocols.

The sensor node 140 is referred to as a sensor tag, and senses recognition information such as a shape or a color of objects or environmental information such as temperature, humidity, or degree of pollution at the circumference according to the sensing request and transmits the sensed information to the gateway 130.

Next, FIG. 1B shows a sensing service network that is another example of the sensing service network, wherein the sensing service network includes components that includes a client 210, a gateway 220, and a sensor node 230, and may further optionally include a service portal 240.

The client 210 is referred to as an issuing agent, and requests sensing information from the gateway 220 or the sensor node 230.

The client 210 can search a database included therein to find a sensor node 230 that provides the client's desired sensing service, and can search it using separate external resources.

The service portal 240, which is one example of the external resources, includes a user interface and/or an authentication process that can be easily accessed by the client 210, and when it receives the search request from the client 210, it searches the sensor node 230 providing the corresponding sensing information and provides the identified information to the client 210.

When the gateway 220 receives the sensing request from the client 210, it transmits the received sensing request to the sensor node 230 of the sensor network.

And, when the gateway 220 receives the sensing information on the sensing request from at least one of sensor node(s) 230, it collects the sensing information and provides the collected sensing information to the corresponding client 210.

To this end, the gateway 200 basically performs a relay role for linking the sensor network with the external network.

The sensor node 230 is referred to as a sensor tag, and senses recognition information on objects or environmental information according to the sensing request of the gateway 220 or the client 210 and transmits the sensed information to the gateway 220 or the client 210.

As described with reference to FIGS. 1A and 1B, the clients 110 and 210 can be connected to the service provider 120 to receive the sensing information, or when the service provider opens the sensor network, can directly access the gateway 220 or the sensor node 230 to obtain the sensing information.

At this time, in order for the gateway or client to designate the specific sensor node to request the desired sensing information, a need exists for unique identification information for identifying the corresponding sensor node.

Herein, since the identification information of the sensor node can be uniquely identified in a global environment and is used in a low-performance sensor network, unlike the existing wired Internet environment, it is designed to have the smallest size, if possible.

If the sensor node is uniquely identified in the gateway layer, there is no problem in communication between the specific gateway and the sensor node, and if the sensor node is uniquely identified in the service provider layer, there is no problem in communication between any gateway and any sensor node that belong to a layer lower than the service provider layer.

An exemplary embodiment of the present invention proposes a sensor node identification system based on the following facts.

Figure 2:
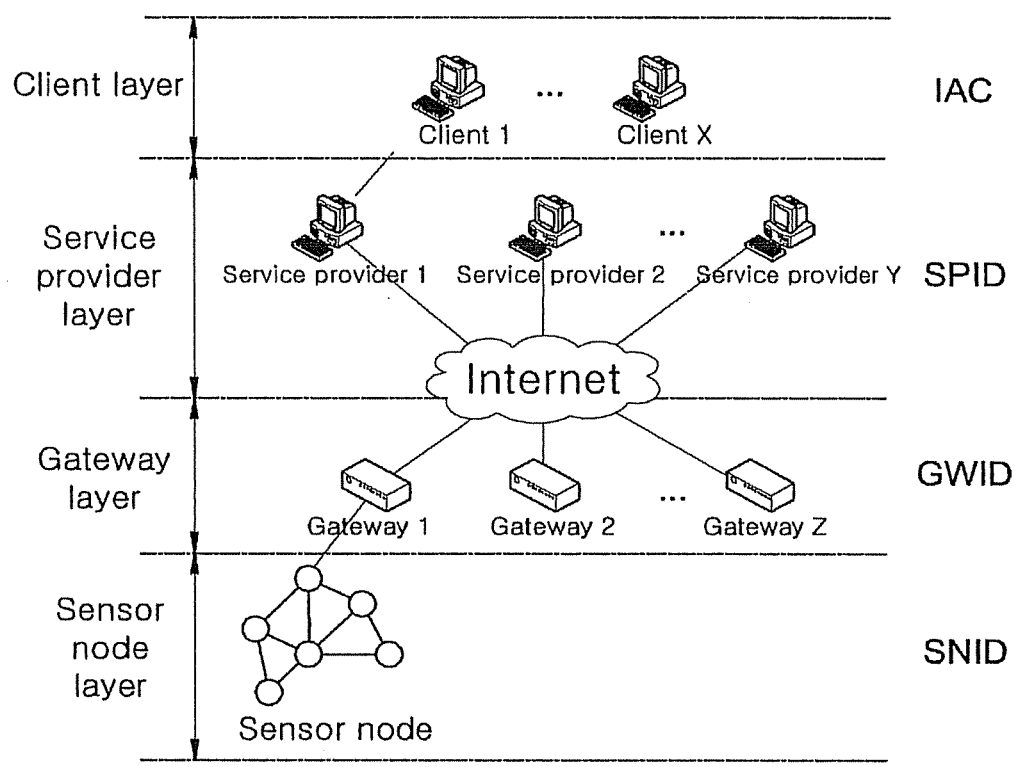
FIG. 2 is a configuration diagram of a sensor network for each layer for describing a sensor node identification system according to an embodiment of the present invention.

FIG. 2 is a configuration diagram of a sensor network for each layer for describing a sensor node identification system according to an embodiment of the present invention.

In FIG. 2, the sensor network for each layer is divided into a client layer, a service provider layer, a gateway layer, and a sensor node layer, and the identifier of the client layer is Issuing Agent Code (IAC), the identifier of the service provider layer is Service Provider ID (SPID), the identifier of the gateway layer is Gateway ID (GWID), and the identifier of the sensor node layer is Sensor Node ID (SNID), respectively.

The IAC may be allocated to identification system management institutions representing each country to hierarchically manage the sensor node identification system according to the embodiment of the present invention, or may be allocated to neutral identification system management institutions rather than a country.

The SPID is used for identifying a provider providing sensing services, and the IAC can perform the allocation and management.

The GWID is used for identifying each gateway that is operated by the service provider, wherein the service provider can perform the allocation and management.

The SNID is used for identifying each sensor node inside the specific gateway, wherein the service provider can perform the allocation and management.

Further, the gateway can automatically allocate the SNID according to the sensor network With the sensor node identification system, the specific gateway of the gateway layer can identify each sensor node that is managed by the SNID, the specific service provider of the service layer can identify the gateway by the GWID, and the specific client of the client layer can identify each service provider that can be connected by the SPID.

This will be described below with reference to a detailed example.

In order to uniquely identify the sensor node for each layer, there is a need to variably configure the sensor node identification information for each layer.

In other words, in the gateway layer, the sensor node identification information is defined by SNID, in the service provider layer, it is defined by "GWID+SNID", and in the global layer for commonly using the sensor node around the world, it is defined by "IAC+SPID+GWID+SNID".

As a special case, when the sensor network is connected to the Internet through more than two gateways, the sensor node can have more than two identifiers in the service provider layer and the gateway layer.

In this case, since the sensor node is uniquely identified from each service provider to the gateway around the world, the SPID of the global layer is defined by "IAC+SPID" and the GWID of the global layer is defined by "IAC+SPID+GWID". Therefore, the SPID and GWID of the sensor node identification information for each layer as described above should be replaced with the SPID of the global layer and the GWID of the global layer.

In summary, the sensor node identification information (Gateway level SNID) of the gateway layer is used for uniquely identifying the specific sensor node inside the specific gateway, the sensor node identification information (Service Provider level SNID) of the service provider layer is used for uniquely identifying the specific sensor node inside the specific service provider, and the global sensor node identification information (Global SNID) is used for uniquely identifying the specific sensor node in the global environment.

Further, the global gateway identifier (Global GWID) is used for uniquely identifying the specific gateway in the global environment and the global service provider identifier (Global SPID) is used for uniquely identifying the specific service provider in the global environment.

A process of forming the sensing services using the above-mentioned sensor node identification method will be described below.

Figure 3:
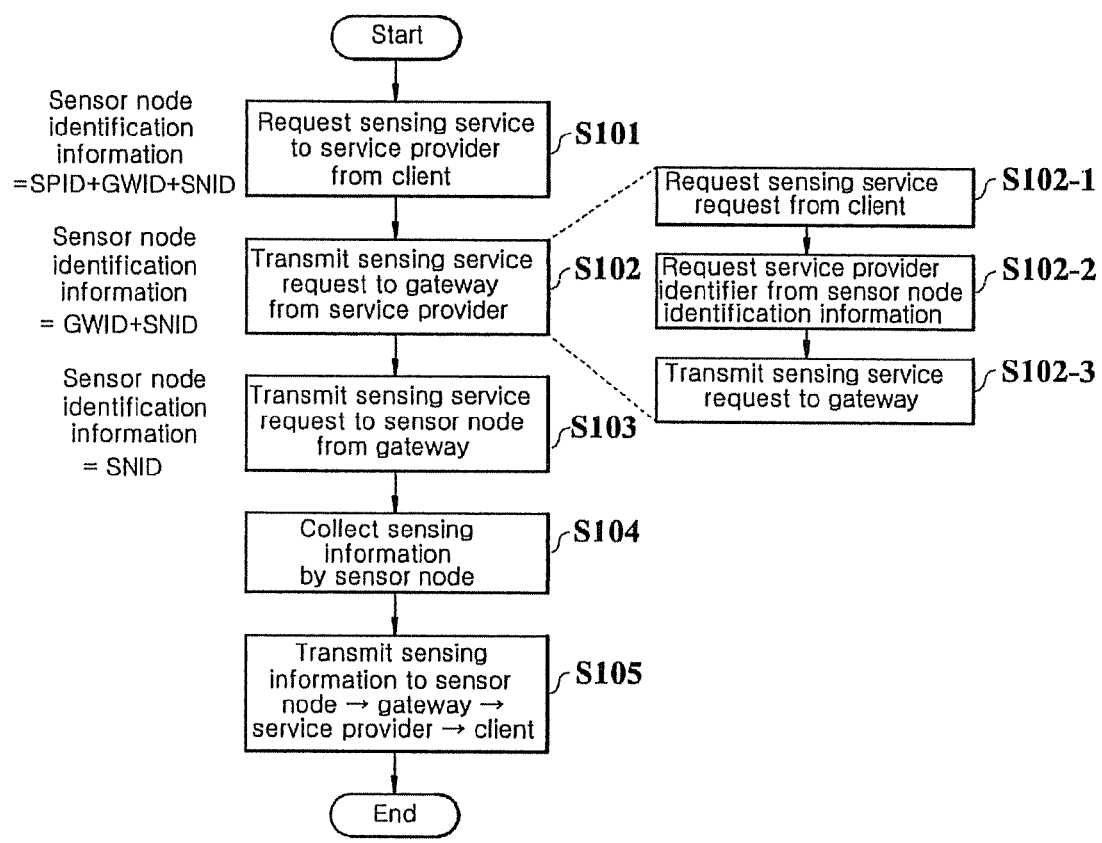
FIG. 3 is a flowchart sequentially showing a sensor node identification method according to an exemplary embodiment of the present invention.

FIG. 3 is a flowchart sequentially showing a sensor node identification method according to an exemplary embodiment of the present invention.

The client searches the sensor node providing the desired sensing services by using the service portal or the database included therein.

The sensor node identification information obtained with the searched results includes the identifiers for each component in the sensing service network that should be passed in order to access the targeted sensor node.

In other words, the searched sensor node identification information is a structure formed by a combination of the service provider identifier (SPID), the gateway identifier (GWID), and the sensor node identifier (SNID), and the client transmits the sensing request including the sensor node identification information to the service provider (S101).

The service provider removes the identifier (SPID) indicating itself among the sensor node identification information included in the sensing request, and then transmits the sensing request including the modified sensor node identification information to the gateway (S102).

In detail, when the service provider receives the sensing request from the client (S102-1), it compares its own identifier with the service provider identifier SPID included in the corresponding request sensor node identification information.

If they are different from each other, the sensing request is transmitted to the wrong service provider. As a result, the corresponding sensing request is discarded as it is by the predetermined rule or transmitted to other peripheral service providers.

If they are identical, the sensing request is transmitted to the right service provider. As a result, the service provider removes the service provider identifier (SPID) from the sensor node identification information included in the corresponding service request (S102-2) and then transmits the corresponding service request to the gateway (S102-3).

The gateway removes the identifier (GWID) indicating itself among the sensor node identification information included in the sensing request, and then transmits the sensing request including the modified sensor node identification information to the sensor node (S103).

At this time, the reception of the sensor service request from the service provider depends on the Internet protocol, and the sensing request including the modified identification information is transmitted to the sensor node according to the sensor network protocol.

In detail, when the gateway receives the sensing request from the service provider, it compares its own identifier with the gateway identifier GWID included in the corresponding request sensor node identification information.

If they are different from each other, the sensing request is transmitted to the wrong gateway. As a result, the corresponding sensing request is discarded as it is by the predetermined rule or transmitted to other peripheral gateways.

If they are identical, the sensing request is transmitted to the right gateway. As a result, the gateway removes the gateway identifier (GWID) from the sensor node identification information included in the corresponding service request and then transmits the corresponding service request to the sensor node.

When the sensor node receives the sensing request from the gateway, it compares its own identifier with the sensor node identifier (SNID) included in the corresponding request sensor node identification information.

If they are different from each other, the sensing request is transmitted to the wrong sensor node. As a result, the corresponding sensing request is discarded as it is by the predetermined rule or transmitted to other peripheral sensor nodes.

If they are identical, the sensing request is transmitted to the right sensor node. As a result, the sensor node collects the sensing information according to the content of the corresponding service request (S104).

The collected sensing information is transmitted back to the client via the gateway and service provider (S105).

If the service provider opens the sensor network to allow the client to directly access the gateway or the sensor node, the S102 or S103 can be omitted.

In this case, the sensing request transmitted to the gateway or the sensor node by the client includes "GWID+SNID" or "SNID" as the sensor node identification information, respectively.

Figure 4:
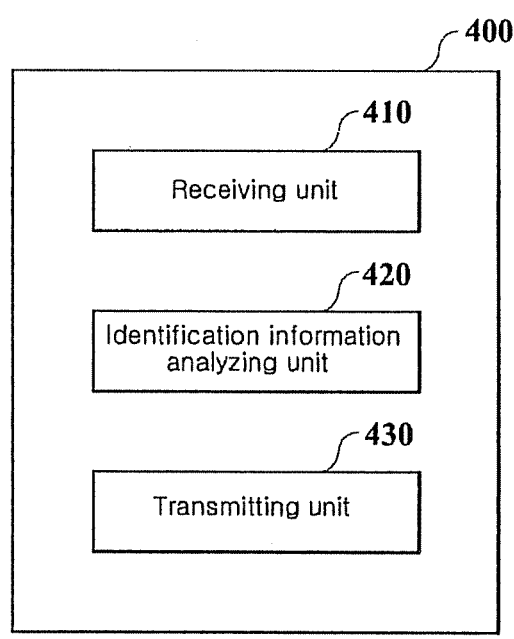
FIG. 4 is a block diagram showing a component structure according to an exemplary embodiment of the present invention.

Next, a component structure of a sensing service network identifying the sensor node according to the exemplary embodiment of the present invention will be described. FIG. 4 is a block diagram showing a component structure according to an exemplary embodiment of the present invention.

The component of the sensing service network indicates the service provider or the gateway, and the sensing service network is divided into the client layer, the service provider layer, the gateway layer, and the sensor node layer. Hereinafter, although a service provider is described as an example of the component, a person of ordinary skill in the art can easily derive the configuration of the gateway through the present description.

A service provider 400 according to an exemplary embodiment of the present invention includes a receiving unit 410, an identification information analyzing unit 420, and a transmitting unit 430.

The receiver 410 receives the sensing request from the specific client of the client layer.

The identification information analyzing unit 420 compares its own identifier with the service provider identifier included in the sensor node identification information of the sensing request, and if they are identical, it removes its own identifier from the sensor node identification information and then transmits the modified sensing request to the transmitting unit 430. If they are not identical, the sensing request is transmitted to the transmitting unit 430.

When the transmitting unit 430 receives the modified sensing request from the identification information analyzing unit 420, it forwards it to the gateway layer. On the other hand, when the non-modified sensing request is transmitted, the corresponding sensing request is forwarded to other service providers of the same layer (service provider layer) or is discarded without performing separate forwarding according to the network rule.

The above-mentioned exemplary embodiments of the present invention are not only embodied by a method and apparatus. Alternatively, the above-mentioned exemplary embodiments may be embodied by a program performing functions that correspond to the configuration of the exemplary embodiments of the present invention, or a recording medium on which the program is recorded. These embodiments can be easily devised from the description of the above-mentioned exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A sensor node identification method by a first component of a first layer in a hierarchical sensor network, comprising:
   receiving a sensing request including sensor node identification information from a second component of a second layer prior to the first layer, the sensor node identification information including an identifier of the first layer and an identifier of a third layer subsequent to the first layer;
   modifying the sensor node identification information by removing the identifier of the first layer from the sensor node identification information when the identifier of the first layer matches an identifier of the first component among the sensor node identification information; and
   transmitting the sensing request including the modified sensor node identification information to a third component of the third layer.

2. The sensor node identification method of claim 1, wherein the first component includes at least one of a client, a service provider, and a gateway.

3. The sensor node identification method of claim 2, wherein,
   when the first component is the service provider, the second component is the client, and the third component is the gateway,
   the sensor node identification information includes information formed by a combination of the service provider identifier, the gateway identifier, and the sensor node identifier.

4. The sensor node identification method of claim 2, wherein,
   when the first component is the gateway, the second component is the service provider, and the third component is the sensor node,
   the sensor node identification information includes information formed by a combination of the gateway identifier and the sensor node identifier.

5. A component of a hierarchical sensor network for identifying a first sensor node of a first layer in the hierarchical sensor network, comprising:
a receiving unit that receives a sensing request including sensor node identification information from a second component of a second layer prior to the first layer, the sensor node identification information including an identifier of the first layer and an identifier of a third layer subsequent to the first layer;
an identification information analyzing unit that modifies the sensor node identification information by removing the identifier of the first layer from the sensor node identification information when the identifier of the first layer matches an identifier of the first component among the sensor node identification information; and
a transmitting unit that transmits a sensing request including the modified sensor node identification information to a third component of the third layer.

6. The component of the hierarchical sensor network of claim 5, wherein the first component includes at least one of a client and a gateway.

7. The component of the hierarchical sensor network of claim 6, wherein,
when the first component is the gateway, the second component is the client, and the third component is the sensor node,
the sensor node identification information is formed by a combination of the gateway identifier and the sensor node identifier.

* * * * *